(No Model.)

M. E. BURRIS.
VEHICLE AXLE.

No. 271,571. Patented Jan. 30, 1883.

Witnesses:
Saml R. Turner
H. A. Daniels

Inventor.
M. Elliott Burris
By W. Burris
Att'y

UNITED STATES PATENT OFFICE.

MICAJAH ELLIOTT BURRIS, OF BROOKLYN, NEW YORK.

VEHICLE-AXLE.

SPECIFICATION forming part of Letters Patent No. 271,571, dated January 30, 1883.

Application filed December 2, 1882. (No model.)

*To all whom it may concern:*

Be it known that I, M. ELLIOTT BURRIS, a citizen of the United States of America, residing at Brooklyn, in the county of Kings and State of New York, have invented certain new and useful Improvements in Vehicle-Axles, of which the following is a specification, reference being had therein to the accompanying drawings.

My invention relates to improvements in vehicle-axles; and it consists of a stationary or non-revolving washer or washer-holder adapted to be adjusted and held on an axle-arm or spindle in position to form the bearing of the outer end of an axle-box, relieving entirely the nut from the ordinary rotary force and friction, so that all the spindles of a vehicle may be provided with right-hand or left-hand screw-threads, and the slack space produced by wear may be readily taken up, and the washer may be kept constantly so close to the end of the box as to prevent rattling without liability of the nut becoming loosened or working off the spindle, as hereinafter fully described.

The main principle of the invention does not depend upon the particular construction or method of securing the holder herein described and shown; but any other form of construction and method may be adopted of providing a non-revolving washer-holder between the end of the box and the nut, so as to entirely relieve it from the rotary force and friction.

Figure 1:
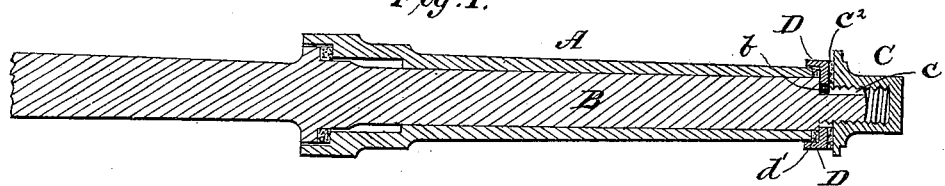
Figure 2:
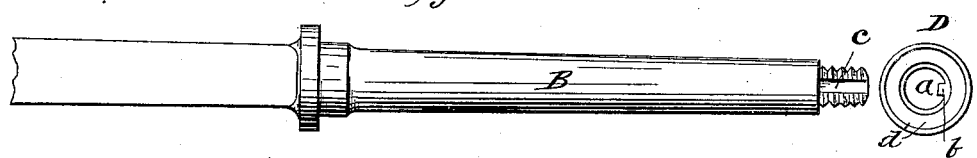
Figure 3:
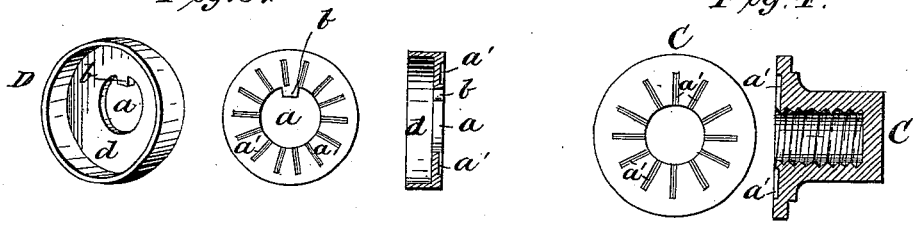
Figure 4:
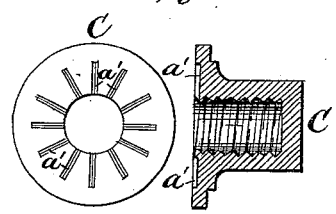
Figure 5:
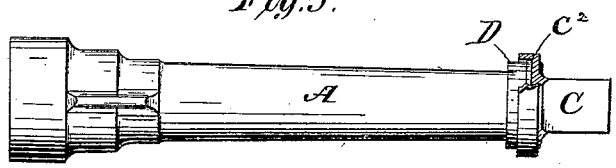
Figure 6:
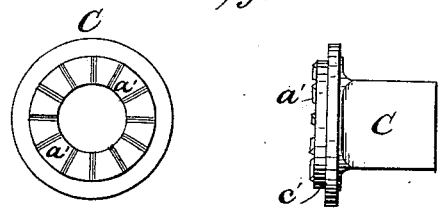
Figure 7:
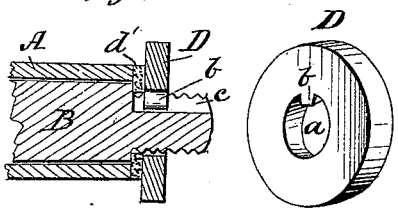

In the accompanying drawings, Figure 1 is a longitudinal central section of an axle-box and spindle provided with my improvements. Fig. 2 is a side view of the spindle and a plan of the inner end of the washer-holder. Fig. 3 illustrates the washer-holder in perspective, plan, and sectional views. Fig. 4 is a plan of the inner face and a section of the nut. Fig. 5 shows the axle-box, washer-holder, and a modified form of the nut, partly in section. Fig. 6 illustrates in a modified form the nut in plan and side views. Fig. 7 illustrates a modified form of the washer-holder in perspective and in section adjusted on the spindle.

A B C represent respectively an axle-box, spindle, and nut.

D in Figs. 1, 2 and 3, represents one form of my improved washer-holder, consisting of a disk having a central hole, $a$, the requisite size to fit loosely over the threaded end of the spindle, and provided with a lug, $b$, to fit in the longitudinal groove $c$, formed in the spindle. The inner side of the holder is provided with a cup, $d$, of the requisite diameter and depth to hold the washer $d'$ and receive loosely the end of the axle-box, as shown in Figs. 1, 2, and 3 of the drawings. Radial corrugations $a'$ are formed upon the outer surface or face of the holder and upon the inner bearing-surface of the nut, to hold the nut from turning by the jarring motion of the vehicle in use.

The holder may be made, as shown in Fig. 7, without the cup, having a flat inner surface, forming thus a non-revolving bearing-surface for the end of the axle-box, or forming the back support for a washer adjusted on the spindle between the holder and box, as seen in Fig. 7.

Instead of making the inner end of the nut a continuous flat surface, it may be provided with a projecting bearing-surface, $c'$, as shown in Fig. 6, and the nut may be constructed with flanges extending partly over the holder, as shown in Fig. 5.

Any suitable locking devices may be employed for holding the nut from becoming unscrewed by the jarring motion of the vehicle; but the radial corrugations on the bearing-surfaces of the nut and holder, which are very simple and readily made, will, it is believed, effectually accomplish that purpose.

A washer, $c^2$, of leather or any other suitably elastic surface, or a spiral-spring washer, may be inserted between the nut and washer-holder, as shown in Fig. 1, the elastic surface of which washer, pressed into the corrugations, will assist in holding the nut from turning and will prevent any rattling that might be caused by the bearing-surfaces of the nut and holder. Such washers serve also to keep the washer $d'$ snug against the end of the axle-box. The threaded end of the spindle must of course be made the requisite length to receive the holder and washers between the nut and the end of the axle-box.

It is evident that without any locking or holding devices the nuts are less liable to be turned on or off by the motion of the carriage with my improvement than where the washers forming the bearing of the ends of the boxes bear directly against the nuts, and that old method does not allow of the nuts being so readily locked, there being no non-revolving bearing-surface for the nut except the small surface of the spindle-shoulder.

To effectually prevent rattling, the washer forming the bearing of the end of the box must be kept constantly so close to it as to allow of no unnecessary play. This is very difficult, if not indeed impracticable, with the ordinary construction and arrangement where the washer bears directly against the end of the nut. In that construction and method, if the washer is too thick, as it frequently is, the nut cannot be screwed up firmly against the shoulder of the spindle without producing too much pressure against the end of the box, and the nut must be turned slightly back to allow free movement of the wheel, and in this condition the nut is liable to be screwed up too tight or to be unscrewed, so as to give too much play or to be run off the spindle entirely by the forward or backward rotary motion of the axle-box. If the washers are thin enough to allow the nut to be screwed up firmly to the shoulder of the spindle, then very little use of the vehicle will wear the washer sufficiently to give too much play, which can be remedied only by removing all the nuts and washers and inserting new washers of the required thickness, and this must be repeated very often. My improved non-revolving washer-holder, relieving the nut entirely from the rotary pressure of the axle-box, prevents the liability of the nut being turned on or off by the rotary motion of the box and allows the nut to be screwed on just far enough to allow free rotary motion of the wheel, leaving no unnecessary play, and as the washer becomes worn the slack space is readily taken up by simply screwing up the nut, which may be done in a few minutes, if desired, every time the carriage is used, thus effectually preventing all liability to rattling without affecting the free movement of the wheels or liability of the washers being turned on or off by the rotary movement of the wheels.

I claim—

1. The combination, with an axle-spindle, B, of a non-revoluble sleeve, D, having a cup, $d$, constructed to hold the washer $d'$ and to receive the end of the axle-box, and adjusted on the spindle in position to relieve the nut entirely from the rotary force of the axle-box, substantially as and for the purposes described.

2. The combination, with the spindle B, having in its threaded part the longitudinal groove $c$, of the non-revoluble sleeve D, provided with the lug $b$, and having the washer-cup $d$, constructed to hold the washer $d'$ and to receive the end of the axle-box, and adjusted on the spindle in position to relieve the nut entirely from the rotary force of the axle-box, substantially as and for the purposes described.

In testimony whereof I affix my signature in presence of two witnesses.

MICAJAH ELLIOTT BURRIS.

Witnesses:
 FRANK M. GREEN,
 H. A. DANIELS.